Figure 1:
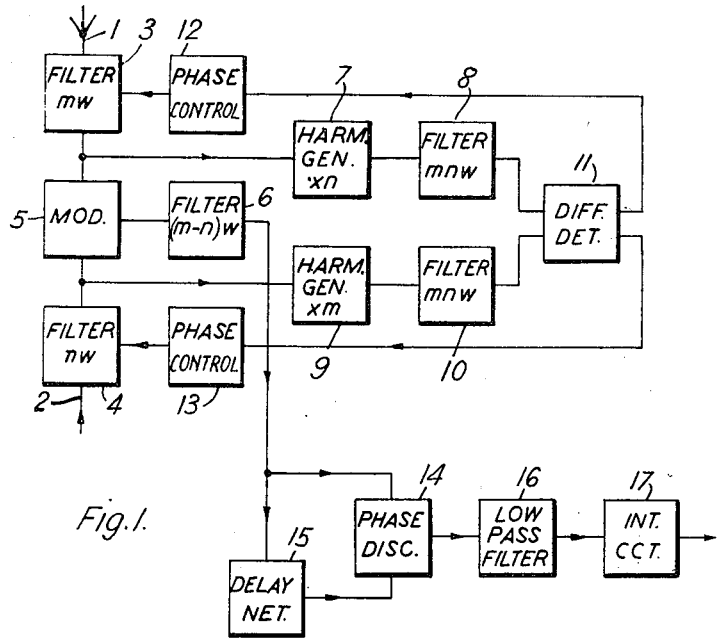

United States Patent Office

2,787,787
Patented Apr. 2, 1957

2,787,787

RECEIVING ARRANGEMENTS FOR ELECTRIC COMMUNICATION SYSTEMS

Charles William Earp, London, England, assignor to International Standard Electric Corporation, New York, N. Y., a corporation of Delaware Application April 15, 1953, Serial No. 348,926

Claims priority, application Great Britain April 25, 1952

8 Claims. (Cl. 343—106)

The present invention relates to receiving arrangements for electric systems of the kind employing one or more ambiguous indices for representing a single item of information.

By "index" is meant a quantity or parameter, such for example, as the time displacement of a pulse, or the frequency or phase of a wave which represents the magnitude of a sample of some function of an electrical wave, the information contained in which is required to be transmitted from a transmitter to a receiver.

By the term "ambiguous" is meant that any one value of the index corresponds to more than one value of the function represented thereby.

There is described and claimed in my U. S. application Serial No. 257,807, filed November 23, 1951, for "Electrical Signal Communication Systems," an electric communication system comprising, at a transmitter means for periodically sampling an electrical wave, means for deriving from each sample a plurality of indices each representing on a continuous scale the same sample but at least one representing the said sample ambiguously and means for transmitting said indices by signals of such nature that the original sample can be reconstituted therefrom unambiguously on a continuous scale.

The advantage of the use of one or more ambiguous indices in improving the signal-to-noise ratio of a communication system depends on the use of a suitable receiving technique for reconstituting each sample of the electrical wave from the corresponding received indices. One such technique is described and claimed in the specification of co-pending U. S. application, Serial No. 257,808, filed November 23, 1951, for "Receivers for Electric Signal Communication Systems." This technique involves the generation of combs of pulses corresponding to the various indices, and reproducing the sample from time coincidences of the pulses of the combs. A comb of pulses as used herein is defined as a train of pulses of a definite length.

Navigational systems are subject to errors due to unwanted reflections (called "site errors") which have much the same effect as noise in a communication system. The effect of such errors can in like manner be greatly reduced by the use of ambiguous direction indications which are analogous to ambiguous indices in communication systems. The specification of copending U. S. application No. 311,435, filed September 25, 1952, for "Radio Navigation," now U. S. Patent No. 2,717,379, issued September 6, 1955, explains how the pulse-comb technique may be applied to the reduction of site errors. This technique consists in the generation of pulse combs of different repetition rates, the modulation of the initiation times of these pulse combs in accordance with a signal and the transmission of an index pulse corresponding with a coincidence of pulses of the two respective combs.

This technique may be inconvenient when the frequencies involved are very high, because with the type of high-frequency valves which it is normally possible to obtain, it may be difficult to produce pulses for the combs with sufficiently short durations.

The principal object of the present invention, therefore, is to provide an alternative technique for dealing with the ambiguous indices at the receiver, which will operate satisfactorily at very high frequencies.

Another object of the invention is to provide a receiving arrangement which is simpler to adjust and maintain in proper operation than the arrangement employing the pulse-comb technique.

These objects are achieved according to the invention by providing an arrangement for receiving in the presence of unwanted interference electrical signals carrying two or more parameters representing the same item of information, comprising means for deriving from the said signals two or more modulated auxiliary waves of different frequencies, each of said waves providing a different representation of the item of information, at least one representation being ambiguous, and means for reproducing the item of information from the said auxiliary waves, including means for deriving from the said waves corresponding modulated waves all having the same frequency, by frequency multiplication of one or more of said auxiliary waves and means controlled by the said corresponding modulated waves for substantially eliminating the interference.

The invention also provides an arrangement for deriving unambiguously an item of information from two waves providing respectively different representations of the item of information, at least one representation being ambiguous, comprising means for translating the frequencies of one or both of the said waves to the same given frequency by a frequency multiplication process, means for deriving a control voltage from the phase difference of the waves of the given frequency, and means for applying the said control voltage to reduce the effects of unwanted phase errors in either or both of the first-mentioned waves.

The invention will be described with reference to the accompanying drawing, in which Figs. 1 and 2 respectively show block schematic circuit diagrams of two embodiments of the invention.

The basis of the invention is shown in Fig. 1. It will be assumed that some item of information is represented by the phase (relative to some standard of phase) of a wave given by $y = a \sin(\omega t + \varphi)$ in which $\omega$ is the angular frequency, and the phase angle $\varphi$ does not vary outside the limits $\pm \pi$, thereby representing the item of information without ambiguity. According to the principles set out in the specification of said U. S. application No. 257,807 already referred to, there are derived from the above wave two auxiliary waves of frequencies $m\omega$ and $n\omega$ where $m$ and $n$ are integers which are prime to one another. Preferably either $m$ or $n$ or their difference is equal to 1. These two waves will be represented by $y = b \sin(m\omega t + m\varphi)$ and $y = c \sin(n\omega t + n\varphi)$. If $m$ or $n$ is greater than 1, the phase of the corresponding auxiliary wave may vary outside the limits $\pm \pi$, and so it will represent the item of information ambiguously. Exactly similar arrangements are used in the navigational system described in the specification of said U. S. application No. 311,435. In both the specifications just referred to, the two auxiliary waves are utilized to reproduce the item of information unambiguously, with the unwanted effects due to noise or site error greatly reduced.

In the case of the accompanying Fig. 1, the two auxiliary waves are applied respectively over conductors 1 and 2 to filters 3 and 4 designed to select the frequencies $m\omega$ and $n\omega$, respectively. The outputs of the filters are supplied to a frequency changing modulator 5 of conventional type, the lower sideband of frequency $(m-n)\omega$ being selected by a filter 6. Assuming that $m-n=1$, the original wave of frequency $\omega$ will be selected by the filter 6 and the information which it carries can be derived from the phase unambiguously. However, if nothing else is done, no advantage will have been gained by the use of the auxiliary waves because the output wave of frequency $\omega$ will be found to be accompanied by the same amount of noise or error as if it had been transmitted direct. This difficulty is overcome according to the present invention in the following way.

The output of the filter 3 is also supplied to a harmonic generator 7 followed by a filter 8 which selects the $n$th harmonic of angular frequency $mn\omega$. Likewise, the output of the filter 4 is supplied to a second harmonic generator 9 followed by a filter 10 which selects the $m$th harmonic which will also be of angular frequency $mn\omega$. These two waves are applied to a differential detector 11, and since they are of the same frequency, the output of the detector will comprise a unidirectional voltage whose magnitude and sign are determined by the magnitude and sign of the phase difference between the two waves. On account of the effects of noise (or site error), the phase difference will be constantly varying. Accordingly the filters 3 and 4 are provided with phase control devices 12 and 13, to which is applied the output voltage from the differential detector in such sense as to reduce the phase difference of the two waves applied to the differential detector.

The phase control devices 12 and 13 may, for example, be reactance valves acting as reactive elements, or part of reactive elements, in the filter networks.

In this way the phase variations due to noise or site error are substantially removed from the waves at the output of the filters 3 and 4, and they may be combined in the modulator 5 with substantially the same advantage as is gained by the use of pulse-combs in the arrangements described in the specifications of the applications already referred to.

It will be shown below that if it be assumed that the probable phase variation due to noise or site error of each of the auxiliary waves is $d\varphi$, then the probable phase variation of the waves at the output of the filter 6 is substantially equal to $(m-n)d\varphi\sqrt{2mn}$.

In order to show the reason for the reduction of the noise or site error produced by the arrangement of Fig. 1, it will be assumed that the waves supplied to the filters 3 and 4 are given by $$P = E \sin (m\omega t + m\varphi + p)$$

and $$Q = E \sin (n\omega t + n\varphi + q)$$

In these equations $\varphi$ is the relative phase which indicates unambiguously the magnitude of the wave sample or other item of information, which is carried ambiguously by the relative phases $m\varphi$ and $n\varphi$ of the waves P and Q. The quantities $p$ and $q$ represent the probable phase variations or errors of the waves, which errors it is desired substantially to eliminate. In practice $p$ and $q$ are both equal to $d\varphi$, but it is convenient to keep them distinct at first. Since $p$ and $q$ are probable errors, the probable error equivalent to the combination of $p$ and $q$ will be substantially equal to $\sqrt{2}d\varphi$. After frequency multiplication, the waves P and Q applied to the differential detector 11 will appear as $$P_1 = E \sin (mn\omega t + mn\varphi + np)$$

and $$Q_1 = E \sin (mn\omega t + mn\varphi + mq)$$

The control voltage at the output of the detector 11 will be proportional to the difference between the angles in the brackets, that is, proportional to $mp - mq$.

If it be first assumed that the correction is applied to the wave P only (that is, the phase control device 13 is not used), then the magnitude of the correction applied to P will be $(np - mq)/n = p - mq/n$ so that the final error of P will be $mq/n$. The phase error of the sideband from the modulator 5 will be the difference between the final error of P and the error of Q, which is $(m-n)q/n$. Likewise, if the correction is applied to the wave Q only, the final error of Q will be $np/m$, and the phase error of the sideband will be $(m-n)p/m$. In the preferred case in which $m-n=1$, it will be seen that the probable error of the sideband is reduced $n$ or $m$ times according as the wave P or the wave Q is corrected.

In the case where both waves are corrected, the proportion of correction may be distributed between them in any desired manner by choosing the relative steepness of control of the devices 12 and 13. If, for example, these devices are chosen to have equal steepness of control, approximately half the correction will be applied to each wave. In this case the correction applied to wave P will be $p/2 - mq/2n$ and the final error will be $p/2 + mq/2n$. Likewise the final error of wave Q will be $q/2 + np/2m$. The error of the output sideband will be the difference of these two errors, which is $(m-n)(mq+np)/2mn$. This error lies between $(m-n)(q+p)/2m$ and $(m-n)(q+p)/2n$; since, as already stated above $q + p = \sqrt{2}d\varphi$, the error lies between $(m-n)d\varphi/n\sqrt{2}$ and $(m-n)d\varphi/m\sqrt{2}$. The probable error after correction will be substantially equal to the geometric mean of these values which is $(m-n)d\varphi/\sqrt{2mn}$, the value given above. In the preferred case in which $m-n=1$ this reduces to $d\varphi/\sqrt{2mn}$.

In some cases it is convenient to choose $n=1$ while $m$ is a moderately large integer such as 10. Then the circuit may be simplified by omitting the elements 7 and 8 (since no multiplication of the frequency $m\omega$ is required in this case). Also elements 5 and 6 are not required because the wave of frequency $\omega$ at the output of the filter 4 carries the information unambiguously, and can be utilised direct. In this case practically all the noise reduction is obtained by correcting the wave Q only by means of the phase control device 13. From what has been explained above, it will be seen that the final probable error of the wave Q will in this case be $p/m = d\varphi/m$. If $m=10$, for example, no appreciable additional advantage can be gained by correcting also the phase of the wave P, and so the cost of providing the device 12 would hardly be justified. If $m$ and $n$ are both large and nearly equal $(m-n=1)$ the probable error $d\varphi/\sqrt{2mn}$, obtained by equally correcting both waves, can be seen to be nearly equal to $d\varphi/m\sqrt{2}$, which is an improvement of about 3 decibels over that obtainable when only one wave is corrected. This will frequently be sufficient to justify correcting both the waves.

Fig. 1 also includes additional elements to indicate the manner in which the present invention may be applied to a receiving arrangement for one of the embodiments of the ambiguous index system described in the specification of U. S. application No. 257,808.

In this embodiment, a speech wave is sampled at 100 microsecond intervals, and in respect of each sample there are transmitted two short wave-packets of frequencies respectively 500 and 450 kilocycles per second, the phase shifts of the packets giving two different and ambiguous representations of the amplitude of the sample. As used herein the term "wave-packet" is meant a short train of sinusoidal waves. At the receiving end, the wave-packets of frequencies 500 and 450 kilocycles per second corresponding to successive samples of the speech wave are separated and applied respectively to the filters 3 and 4, Fig. 1. Thus $\omega=50$ kc./s. $m=10$ and $n=9$. The wave-packets of frequency 50 kilocycles per second obtained at the output of the filter 6 are applied through two parallel paths to a phase discriminator 14, one of which paths includes a delay network 15 introducing a delay of 100 microseconds. It will be seen that by this means the wave-packet corresponding to each speech wave sample, and also that corresponding to the preceding sample, are simultaneously applied to the discriminator 14, which is of the kind which produces an output pulse of amplitude proportional to the phase difference of each pair of wave-packets. The output pulses so obtained are passed through a low pass filter 16 which accordingly recovers the differential of the speech wave. In order to obtain the speech wave itself, therefore, the output of the filter 16 is passed through an integrating network 17.

In this case, the wave-packets of frequency 50 kilocycles per second at the output of the filter 6 carry unambiguously the information (namely, the amplitude of the corresponding sample of the speech wave), and the noise which has been picked up during transmission is substantially removed by the action of the phase control devices 12 and 13.

Figure 2:
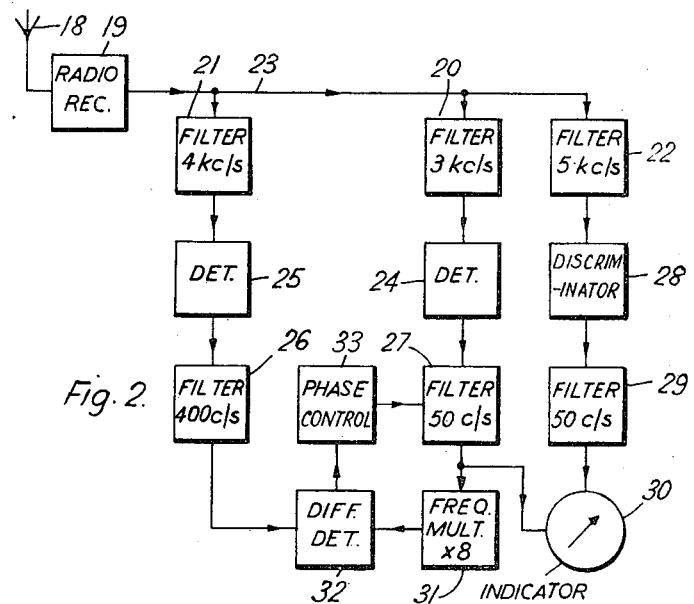

Fig. 2 shows an application of the invention to a radio navigation system of the kind described in the specification of application No. 311,435, and is a modification of the receiver shown in Fig. 2 of that specification. This receiver is intended to be carried by an aircraft or other mobile unit for indicating the direction of a beacon station. The beacon station generates three indicating waves; namely, a wave of frequency $F_0+F_1$ radiated on a single-lobed cardiode field pattern which rotates uniformly at a low frequency $f$; a wave of frequency $F_0+F_2$ radiated on a symmetrical "daisy" field pattern with $m$ lobes which also rotates uniformly at the low frequency $f$; and a third wave of frequency $F_0$ which is amplitude modulated by a wave of frequency $F_3$ which itself is frequency modulated by a wave of frequency $f$. The third wave is uniformly radiated in all directions, and both sidebands and the carrier frequency $F_0$ are transmitted. The wave of frequency $f$ is used at the receiver as a standard or reference of phase.

The frequencies $F_1$, $F_2$ and $F_3$ should be small compared with $F_0$ and large compared with $f$. The direction indication can be obtained unambiguously from the single lobe pattern, but with poor precision on account of the site error, and with high precision but ambiguously from the multi-lobed pattern. By appropriate combination of the indications from both kinds of lobes an unambiguous indication of high precision can be obtained.

In a practical case, the frequencies of $F_1$, $F_2$, $F_3$ and $f$ could for example be chosen to be, 3,000, 4,000, 5,000 and 50 cycles per second, respectively, and $m$ can conveniently be chosen equal to 8. In the accompanying Fig. 2, these particular values will be assumed.

The three indicating waves are received on an antenna 18 connected to a conventional radio receiver 19 in which the carrier wave $F_0$ from the third wave is used to demodulate all the waves, whereby are produced demodulated waves of frequencies 3,000, 4,000 and 5,000 cycles per second which are respectively selected by the filters 20, 21 and 22, connected to the output conductor 23 of the receiver 19. It will be clear that the 3,000 and 5,000 kilocycle waves will be modulated with 50 cycles per second while the 4,000 kilocycle wave which comes from the 8-lobed pattern will be modulated with 400 cycles per second.

The filters 20 and 21 are followed by detectors 24, 25 and filters 26, 27 for respectively selecting the 50 cycle and 400 cycle waves. These two waves will be phase modulated in accordance with the direction of the beacon station, the modulation of the 400 cycle waves being ambiguous.

The filter 22 is followed by a frequency discriminator 28 which recovers the 50 cycle reference wave, which is selected by a filter 29. The phase difference of the waves of frequency $f$ at the outputs of the filters 27 and 29 then gives the direction of the beacon station and is determined by an indicator 30, which may be of the dynamometer type, to which the outputs of the filters 27 and 29 are connected. In order substantially to remove the site error affecting the single-lobed pattern, the ambiguous indication from the 8-lobed pattern is utilised. One way of doing this is described in the specification of U. S. application No. 311,435. Fig. 2 accompanying the present specification shows another way according to the present invention.

The output of the filter 27 is connected to a frequency multiplier 31 which multiplies by 8. This multiplier could, for example, comprise a harmonic generator (not shown) followed by a filter (not shown) which selects a frequency of 400 cycles per second. The outputs of the filter 26 and of the multiplier 31 are applied to a differential detector 32 the output voltage of which is used to control a reactance valve 33 or other phase control device connected to, or forming part of, the filter 27 in the manner described with reference to Fig. 1. In this way the effects of site error are substantially removed from the 50 cycle wave at the output of the filter 27 according to the principles explained with reference to Fig. 1. It will be noted that Fig. 2 is a case in which $n=1$ and $m=8$, and accordingly no appreciable further advantage would be gained by applying a phase correction to the filter 26.

While the principles of the invention have been described above in connection with specific embodiments, and particular modifications thereof, it is to be clearly understood that this description is made only by way of example and not as a limitation on the scope of the invention.

What I claim is:

1. An arrangement for receiving in the presence of unwanted interference electrical signals carrying two or more parameters representing the same item of information comprising means for deriving from the said signals a plurality of modulated auxiliary waves of different frequencies, each of said waves providing a different representation of the item of information, at least one representation being ambiguous, and means for reproducing the item of information from the said auxiliary waves including means for deriving from the said waves a like plurality of corresponding modulated waves all having the same frequency said deriving means including frequency multiplying means for multiplying the frequency of at least one of said auxiliary waves, and means controlled by the said corresponding modulated waves for substantially eliminating the interference.

2. An arrangement for receiving two or more phase modulated waves of different frequencies which are integral submultiples of a given frequency, and which provide respectively different representations of the same item of information, at least one such representation being ambiguous, such waves also bearing an interfering phase modulation, comprising means for reproducing the item of information unambiguously from all the said phase modulated waves, including means for multiplying the frequencies of the said waves by such integers as will bring all their frequencies to the given frequency, and means for comparing all the waves of the given frequency with each other, and phase shifting means responsive to said comparison for substantially neutralising the interfering phase modulation of at least one of the first-mentioned waves.

3. An arrangement for deriving unambiguously an item of information from two wave providing respectively different representations of the item of information, at least one representation being ambiguous, comprising means for translating the frequencies of one or both of the said waves to the same given frequency including means for frequency multiplying one of said waves, means for deriving a control voltage from the phase difference of the waves of the given frequency, means for phase shifting at least one of said first-mentioned waves, and means for applying the said control voltage to said phase shifting means to reduce the effects of unwanted phase errors in either or both of the first-mentioned waves.

4. An arrangement for receiving two electrical waves having frequencies whose ratio is equal to an integer greater than 1, the said waves each being phase modulated in accordance with an item of information in such manner that the wave of higher frequency represents the item ambiguously, comprising means for multiplying the frequency of the lower frequency wave by the said integer, means for applying the wave after multiplication of its frequency, together with the other wave to a phase discriminator in order to produce a control voltage proportional to the phase difference of the two applied waves, which phase difference results from interference accompanying the phase modulation of the said waves, means for phase shifting said lower frequency wave, means for applying the control voltage to said phase shifting means substantially to eliminate the interference accompanying the phase modulated wave of lower frequency, and means for deriving the item of information from the last mentioned wave after elimination of the interference.

5. An arrangement for receiving two electrical waves having frequencies which are different integral submultiples of a given frequency, at least one of the said waves being phase modulated ambiguously in accordance with an item of information, comprising means for translating the frequencies of both the said waves to the given frequency including means for frequency multiplying at least one of said waves, means for applying both the said waves after translation of the frequency to a phase discriminator in order to produce a control voltage proportional to their phase difference, such phase difference being due to interference accompanying the phase modulation of the said waves, means for phase controlling at least one of said first-mentioned waves, means for applying the control voltage to said phase shifting means substantially to eliminate the interference accompanying one or both of the first-mentioned electrical waves, means for applying first-mentioned electrical waves, after elimination of the interference, to a frequency changing modulator, means for deriving the lower sideband output from the modulator, and means for deriving the item of information from said lower sideband.

6. An arrangement according to claim 5 in which the electrical wave from which the interference is to be removed is passed through a filter having as one of its elements a variable reactance device controlled by the said control voltage, said filter constituting said phase controlling means.

7. An electric communication system comprising means for periodically sampling an electrical wave, means for deriving from each sample two electrical wave-packets having frequencies which are different integral submultiples of a given frequency, such wave-packets being phase modulated in accordance with the magnitude of the sample, the phase modulation of both the waves representing the sample ambiguously, comprising an arrangement according to claim 5 for receiving the wave-packets which are said first-mentioned waves, in which the last mentioned means comprises means for delaying the sideband wave-packets by a period equal to the sampling period, means for applying the delayed and undelayed wave-packets to a phase discriminator in order to obtain an output pulse having amplitude proportional to the phase difference of the two applied wave-packets, and means for recovering the electrical wave from the output pulses corresponding to a succession of received wave-packets.

8. A radio navigational system comprising a radio beacon station adapted to radiate a first wave of frequency $F_0F_1$ in a field pattern having a single lobe, a second wave of frequency $F_0F_2$ in a field pattern having $m$ symmetrically arranged lobes, where $m$ is an integer greater than 1, and a third wave of frequency $F_0$ modulated by a wave of frequency $F_3$ which itself is modulated by a wave of low frequency $f$, the said third wave being radiated omnidirectionally, and means for rotating the lobes corresponding to the first and second waves at the low frequency $f$; and a mobile station comprising means for receiving the waves radiated by the beacon station, means for separately recovering direction indicating waves of frequencies $f$ and $mf$ from the first and second radiated waves, means for recovering a reference wave of frequency $f$ from the third radiated wave, and an arrangement according to claim 4 in which the first-mentioned electrical waves are represented by the said direction indicating waves, and in which the last mentioned means comprises a phase indicator to which are applied the indicating wave of frequency $f$ from which the interference has been eliminated, and the reference wave of frequency $f$, for indicating the phase difference between the two applied waves.

References Cited in the file of this patent

UNITED STATES PATENTS

| | | |
|---|---|---|
| 2,394,544 | Gottier | Feb. 12, 1946 |
| 2,422,110 | Luck | June 10, 1947 |
| 2,565,506 | Litchford | Aug. 28, 1951 |
| 2,632,101 | Quarles | Mar. 17, 1953 |